United States Patent Office 3,160,562
Patented Dec. 8, 1964

3,160,562
COMPOSITION CONTAINING ERGOTAMINE, CAFFEINE AND HYDANTOIN DERIVATIVES FOR CEPHALALGIA
Aurelio Cerletti, Bottmingen, Basel-Land, and Albert Fanchamps, Basel, Switzerland, assignors to Sandoz Ltd. (also known as Sandoz A.G.), Basel, Switzerland
No Drawing. Filed June 25, 1963, Ser. No. 290,300
Claims priority, application France June 27, 1962
2 Claims. (Cl. 167—65)

The present invention relates to a pharmaceutical composition comprising a mixture of active ingredients having unexpected properties.

The present invention provides a pharmaceutical composition containing, in addition to an inert, physiologically acceptable carrier, (i) dihydroergotamine or an acid addition salt thereof, (ii) caffeine and (iii) 5,5- diphenylhydantoin (i.e., phenytoin) or 3-methyl-5-ethyl-5-phenylhydantoin (i.e., mephenytoin). The preferred composition of the present invention is the one containing phenytoin. This pharmaceutical composition is especially suitable for treating headache patients, e.g., for prophylactic treatment of migraine.

It should be noted that the hydantoin may be present in the form of an alkali metal salt and this is also within the scope of the present invention.

Preferably, the quantities of (i), (ii) and (iii) are 0.0005–0.002 g., 0.02–0.1 g. and 0.05–0.2 g. respectively per unit of dosage In general, these ranges are to be understood in such a way that the actual amounts of the three constituents present are chosen at corresponding points in the ranges, e.g., all three constituents should be present in the maximum amount and not a maximum of one with a minimum of the other two.

The compositions of the invention are preferably in the form of solid dosage units, i.e., are formed as discrete units, each such unit containing a single dose of each of the ingredients (i), (ii) and (iii). Especially preferred discrete units are tablets, capsules lozenges and pills; however, they may likewise be in the form of suppositories, the carrier being a suppository base.

Caffeine has a mitigating effect on cephalalgia crises, but this is usually insufficient when used alone; hence it has been proposed to use it in combination with an analgesic or ergotamine. Ergotamine or an ergotamine/caffeine mixture, also termed Cafergot (registered trade mark) have an inhibitory or curative effect on cephalalgia, especially on the onset of migraine; although they constitute an excellent specific treatment for this, some patients suffering from headaches are not amenable to this treatment, e.g., because of undesirable side effects.

Dihydroergotamine has a preventive effect on certain forms of headaches; when regularly administered during prolonged treatment it prevents the onset of cephalalgia crises, but all patients do not respond equally favourably to this treatment. For example, this treatment is ineffective with persons, suffering from headaches, whose electroencephalogram (EEG) shows dysrhythmia.

It has now been discovered, surprisingly, that the composition of the invention has a preventive effect especially in the case of trigeminal neuralgia and headaches which are not amenable to other pharmaceuticals and that it is especially suitable for prophylactic treatment of cephalalgia, especially migraine. Headaches which show a dysrhythmia or other anomalies of the EEG have been found to respond favourably to propyhlactic treatment with the composition of the invention. Its therapeutic indication, however, does not limit it to these headaches and headaches which are not accompanied by dysrhythmia of the EEG also respond favourably to treatment with the composition of the present invention.

The composition of the present invention has been tested successfully in prophylactic treatment of the following complaints:

(1) Vasomotor headaches and Horton's syndrome,
(2) Headaches with dysrhythmia of the EEG,
(3) Migraine,
(4) Headaches of various origin which do not respond favourably to other pharmaceuticals,
(5) Trigeminal neuralgia.

The effectiveness of the composition of the present invention in minimizing or preventing the types of headache described above could not be predicted from the properties of its constituents. The essential feature of the invention is the combination of one of the two hydantoins mentioned above with dihydroergotamine and caffeine, but it is stressed that even the combination of (i) dihydroergotamine and (ii) caffeine is also novel. Neither of the said two hydantoins has analgesic or vascular properties; their pharmacological action essentially consists in raising the convulsive threshold, as is shown in pharmacological tests with animals and in clinical tests with humans. The only therapeutic indication hitherto known for these two hydantoins is the treatment of certain forms of epilepsy; their use in the manner indicated herein for the preventive treatment of headaches is an entirely new use which could not have been predicted from their pharmacological properties. A further unexpected effect of the composition of the present invention is its preventive effect in cases of neuralgic crises of trigeminal neuralgia.

The specific pharmaceutical compositions shown below were used for clinical tests. These specific compositions are given solely by way of examples and the composition of the present invention is not limited to the weight ratios quoted below.

| Substance | Dragées A | | Dragées B | |
|---|---|---|---|---|
| | Weight, gram | Percent | Weight, gram | Percent |
| Dihydro-ergotamine methane sulphonate | 0.0010 | 0.17 | 0.0010 | 0.17 |
| Anhydrous caffeine | 0.050 | 8.33 | 0.050 | 8.33 |
| 5,5-diphenylhydantoin | 0.10 | 16.67 | | |
| 3-methyl-5-ethyl-5-phenyl-hydantoin | | | 0.10 | 16.67 |

| Dragées A and B | | |
|---|---|---|
| | Weight, gram | Percent |
| Gelatine | 0.010 | 1.67 |
| Talc | 0.0110 | 1.83 |
| Stearic acid | 0.0120 | 2.0 |
| Maize starch | 0.040 | 6.67 |
| Lactose | 0.1260 | 21.0 |
| Dragée paste† | †0.250 | 41.66 |

† The 0.250 g. of dragée paste consisted of:
Gum arabic, 0.008 g.
Saccharose, 0.152 g.
Talc, 0.090 g.

The dihydroergotamine methane sulphonate is mixed with about one twentieth part of the total lactose; then the other two pharmaceutically active substances and the rest of the lactose are added. Granulation is then effected with an alcoholic solution of about one third of the stearic acid and an aqueous solution of the gelatine. The rest of the stearic acid is then added to the dried granulate, together with the talc and the maize starch and the mixture pressed into pellets which are made into dragées in manner known per se, so that 100 g. of dragée mass is converted into about 167 dragées of 0.60 g. each.

In Table I below, clinical trial results with dragées A above are shown; the initial treatment when it was successful was continued for 2–4 weeks, whereafter the initial dosage (2 to 3 dragées per day, 4–6 dragées in especially resistant cases) was progressively reduced in appropriate stages and finally discontinued, depending on the reaction to the treatment of each individual patient.

TABLE I

| Indication | Number of cases treated | Therapeutic Effect | | |
|---|---|---|---|---|
| | | Very good (complete prevention) | Good to mediocre | None (no preventive effect) |
| Vasomotor headaches | 94 | 41 | 37 | 18 |
| Horton's syndrome | 1 | 1 | | |
| Headaches with dysrhythmia of the EEG | 24 | 10 | 8 | 6 |
| Migraine | 25 | 6 | 9 | 10 |
| Recalcitrant headaches | 9 | 5 | | 4 |
| Neuralgia of the trigeminal | 2 | 1 | 1 | |

Side effects were observed only rarely and then usually only mild ones.

Clinical tests carried out with dragées B gave similar therapeutic results.

A comparative pharmacological investigation of acute toxicity caused by that composition of the present invention which contains phenytoin, and the toxicity of each of its three active constituents was then undertaken.

The 50% lethal dosages (DL 50) are indicated in Table 2 below.

TABLE 2

*DL 50 (Buccal Administration)*

| Substance | White mice, mg./kg. | Rabbit, mg./kg. |
|---|---|---|
| Dihydroergotamine | >8.000 | >8.000 |
| Phenytoin | 870 | >3.000 |
| Caffeine | 310 | 450 |
| Compositions as in dragée A above | 378 | 634 |

From the foregoing it will be seen that the beneficial therapeutic effect of the composition of the present invention is due to a synergistic effect possessed by the combination of the dihydroergotamine, caffeine and one of the two specified hydantoins; as opposed to previously known cephalalgia treatments, the composition of the present invention has been found to have a prophylactic effect.

What is claimed is:

1. A pharmaceutical composition consisting of (i) a member of the group consisting of dihydroergotamine and pharmaceutically acceptable acid addition salts thereof, (ii) caffeine, (iii) a member of the group consisting of 5,5-diphenylhydantoin and 3-methyl-5-ethyl-5-phenylhydantoin, and an inert, physiologically acceptable carrier wherein the quantities of (i), (ii) and (iii) are 0.0005–0.002 g., 0.02–0.1 g. and 0.05–0.2 g. respectively, per unit of dosage.

2. A pharmaceutical composition according to claim 1, consisting of dihydroergotamine methane-sulphonate, caffeine, 5,5-diphenyl-hydantoin, and an inert, physiologically acceptable carrier.

No references cited.